United States Patent
Perez

(10) Patent No.: US 8,432,907 B2
(45) Date of Patent: Apr. 30, 2013

(54) METHOD AND SYSTEM HAVING AN APPLICATION FOR A RUN TIME IPV6 ONLY NETWORK

(75) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 138 days.

(21) Appl. No.: 12/980,471

(22) Filed: Dec. 29, 2010

(65) Prior Publication Data

US 2012/0170576 A1  Jul. 5, 2012

(51) Int. Cl.
*H04L 12/28* (2006.01)
*H04L 12/56* (2006.01)

(52) U.S. Cl.
USPC .................... 370/389; 370/391; 370/392

(58) Field of Classification Search ............ 370/241, 370/389, 390, 391–392; 709/238
See application file for complete search history.

(56) References Cited

U.S. PATENT DOCUMENTS

| | | | |
|---|---|---|---|
| 7,433,814 B2 * | 10/2008 | Liu et al. ................ | 703/23 |
| 2003/0107990 A1 * | 6/2003 | Herschleb et al. ......... | 370/229 |
| 2004/0213237 A1 * | 10/2004 | Yasue et al. ............ | 370/392 |
| 2005/0100032 A1 * | 5/2005 | Patiejunas ............... | 370/410 |
| 2005/0125691 A1 * | 6/2005 | Garg et al. .............. | 713/201 |
| 2008/0267176 A1 * | 10/2008 | Ganesh et al. ........... | 370/389 |
| 2009/0154348 A1 * | 6/2009 | Newman ................ | 370/230 |
| 2011/0134758 A1 * | 6/2011 | Fujisawa ................ | 370/241 |
| 2012/0106354 A1 * | 5/2012 | Pleshek et al. .......... | 370/241 |

* cited by examiner

*Primary Examiner* — Chuong T Ho
(74) *Attorney, Agent, or Firm* — Buchanan Ingersoll & Rooney PC

(57) ABSTRACT

A system that facilitates a network environment, which includes a computer device, the computer device have a software module, which performs the steps of: (a) establishing an IP network criteria for incoming and outgoing packets for the computer device; (b) retrieving the incoming and outgoing packets to determine if an IP address for the incoming and outgoing packets meet the IP network criteria; (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection.

18 Claims, 3 Drawing Sheets

METHOD AND SYSTEM HAVING AN APPLICATION FOR A RUN TIME IPV6 ONLY NETWORK

FIELD OF THE INVENTION

The present invention relates to a method and system for processing data packets using an application, which filters incoming and outgoing data packets by Internet Protocol (IP), and more particularly to a method and system having an application for a run time IPv6 (Internet Protocol version 6) only network.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. It is anticipated that the transition between IPv4 Internet and an IPv6-based Internet will be a long process during which both protocol versions will coexist.

During the gradual transition, existing IPv4 applications are able to work with the newer IPv6 enabled application using a dual-stack, which includes both an IPv4 protocol stack and an IPv6 protocol stack. The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages (i.e., Neighbor Discovery Protocol or NDP). When first connected to a network, an IPv6 host sends a link-local multicast neighbor solicitation request advertising its tentative link-local address for double address detection (dad), if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

It can be appreciated that for certain devices and apparatuses, it will be desirable to have an IPv6 only network, which provides added security to existing networking devices that is currently not available with existing IP protocols including IPv4 and ARP (Address Resolution Protocol).

SUMMARY OF THE INVENTION

In consideration of the above issues, it would be desirable to have a software module or software application associated with a computer device or host device such as an image forming apparatus, which filters incoming data packets for a runtime IPv6 only network.

In accordance with an exemplary embodiment, a system that facilitates an IP network environment comprises: a computer device, the computer device have a software module, which performs the following steps: (a) establishing an IP network criteria for incoming and outgoing packets for the computer device; (b) retrieving the incoming and outgoing packets to determine if an IP address for the incoming and outgoing packets meet the IP network criteria; (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection.

In accordance with a further exemplary embodiment, a method of enabling a computer device to facilitate an IP network environment comprises: (a) establishing an IP network criteria for incoming and outgoing packets for the computer device; (b) retrieving the incoming and outgoing packets to determine if an IP address for the incoming and outgoing packets meet the IP network criteria; (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection.

In accordance with another exemplary embodiment, a computer program product comprising a non-transitory computer usable medium having a computer readable code embodied therein for controlling a computer device, the computer readable program code configured to cause the computer device to accept only IPv6 network packets, the process comprising the steps of: (a) establishing an IP network criteria for incoming and outgoing packets for the computer device; (b) retrieving the incoming and outgoing packets to determine if an IP address for the incoming and outgoing packets meet the IP network criteria; (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
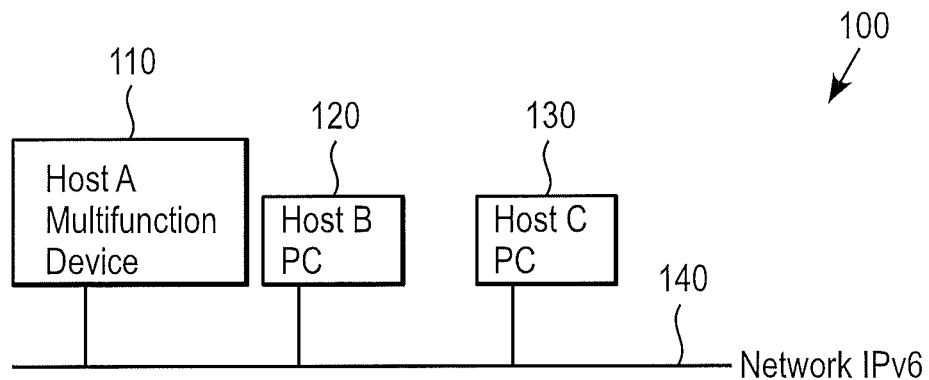
FIG. 1 is an illustration of a network system with a network communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a network system 100 having a communication protocol, which includes a host device (Host A) 110 in the form of an image forming apparatus or multi-functional device in accordance with an exemplary embodiment. As shown in FIG. 1, the network system 100 is composed of a host device (or an image forming apparatus) 110 and one or more second hosts or client devices (Host B, Host C) 120, 130. In accordance with an exemplary embodiment, the host device (or image forming apparatus) 110 and the one or more second hosts (or client devices) 120, 130 are connected to each other through a communication network 140 in a state capable of performing data communications. Examples of communication networks 140 consistent with embodiments of the invention include, but are not limited to, the Internet, an Intranet, a local area network (LAN) and a wide area network (WAN). The host device (or image forming apparatus) 110 and the one or more second hosts (or client devices) 120, 130 can be connected with a wire or can be connected with a wireless connection by using radio frequency (RF), infrared (IR) transmission, USB, IEEE1394 and/or other suitable wireless technology.

It can be appreciated that in accordance with an exemplary embodiment, the host device (or image forming apparatus) 110 may be embodied by a printer, a Multi-Function Peripheral (MFP) and other known image forming apparatuses, which prints an image on a printing medium (or a recording medium) such as a sheet of paper based on printing data generated by the one or more second hosts (or client devices) 120, 130. In accordance with an exemplary embodiment, the host device (or image forming apparatus) 110 is a Multi-Function Peripheral (MFP), which includes at least a copy function, an image reading function, and a printer function, and forms an image on a sheet based on a print job (print instruction) sent from the one or more second hosts (or client devices) 120, 130, image data read by an image reading section, such as a scanner, provided in the host device (or image forming apparatus) 110, or the like.

In accordance with an embodiment, the one or more second hosts (or client devices) 120, 130, which may be embodied by a computer system, and generates the printing data usable in the host device (or image forming apparatus) 110 and transmits the generated printing data to the host device (or image forming apparatus) 110. An example of the one or more second hosts (or client devices) 120, 130 may include a computer and/or a portable device such as a notebook personal computer, a cellular phone and a personal digital assistant (PDA). The host device (or image forming apparatus) 110 and the one or more second hosts (or client devices) 120, 130 can constitute an image forming system to install a communication port, to generate printing data, and to perform a printing operation of forming an image on a printing medium according to the printing data.

It can be appreciated that the one or more second hosts (or client devices) 120, 130 can be a plurality of personal computers, and has the function of sending a print job to the first host device 110 in the form of an image forming apparatus. A printer driver program (hereinafter, sometimes simply referred to as a printer driver) is installed in the second host 120, and the one or more second hosts 120, 130 uses the function of the printer driver to generate a print job including the data of print conditions to be applied at the time of image formation, image data, and the like, and to send the generated print job to the first host device 110 in the form of an image forming apparatus.

Figure 2:
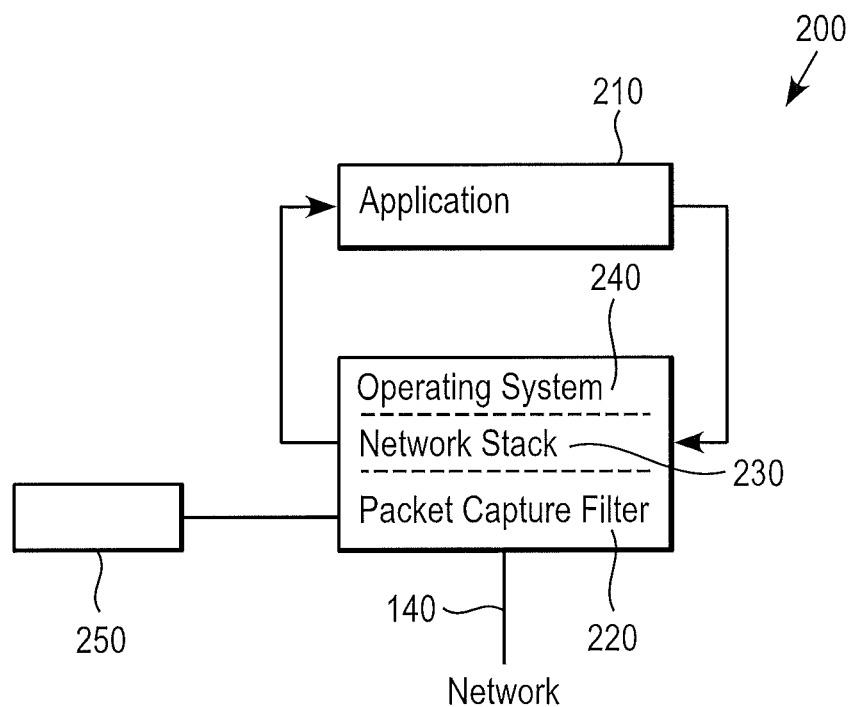
FIG. 2 is an illustration of a network stack having an application for filtering data packets in accordance with another exemplary embodiment.

FIG. 2 is an illustration of a network stack having an application for filtering data packets in accordance with an exemplary embodiment. The computer device 200 includes a software module (or application) 210, which can be controlled by a network administrator, which filters incoming and outgoing data packets by Internet Protocol (IP). The software module 210 is preferably an application level module, which monitors and manages outgoing packets from the network stack or network layer 230 (i.e., IPv6 Layer), or alternatively, monitors and manages the incoming packets before the packets reach the network stack (or network layer) 230. The network stack or network layer 230 is generally responsible for the generation and routing delivery of the incoming and outgoing packets from the computer device and network connection, respectively.

As shown in FIG. 2, the software module 210 includes a packet capture filter 220, which captures the incoming and outgoing data packets. In accordance with an exemplary embodiment, the packet capture filter 220 captures the incoming packets before the packets reach the network stack or layer 230, and the outgoing packets from the network stack 230 before the outgoing packets are broadcast or sent from the computer device 200 to the network (or network connection). In addition, the software module 210 is preferably configured to continuously monitor the packet capture filter 220 and the corresponding incoming and outgoing packets to determine if an IP address for the incoming and outgoing packets meet an IP network criteria, which is defined by the software module 210. For example, the IP network criteria can be IPv6 addresses only, such the computer device 200 operates on an IPv6 only network. Accordingly, upon receipt of the incoming packets and outgoing packets, the packet capture filter 220 forwards the incoming or outgoing packet to the software module 210, which has an established IP network criteria for incoming and outgoing packets for the computer device 200.

In accordance with another exemplary embodiment, the packet capture filter 220 intercepts the incoming and outgoing packets and directs the incoming and outgoing packets into a queue 250 for processing by the software module 210. The software module 210 preferably continuously monitors and manages the queue 250 for incoming and outgoing packets to determine if the packets meet the established IP network criteria. It can be appreciated that the software module 210 can also modify the incoming and outgoing packets as needed to meet the desired IP network criteria.

The packet capture filter 220 is preferably configured to intercept the incoming packet before a network layer analyses of the incoming packet, and the outgoing packets after a network layer has created the packet and before forwarding the outgoing packet to a data link layer. It can be appreciated that the data link layer is a protocol layer, which transfers data between adjacent network nodes in a wide area network or between nodes on a same local area network segment.

In accordance with an exemplary embodiment, the IP network criteria is set to IPv6 addresses only. Thus, if the IP address for the incoming and outgoing packets is an IPv6 address, the software module 210 forwards the incoming packets having the IPv6 address to the network stack or layer 230 of the computer device 200. In addition, if the outgoing packets have an IPv6 address, the outgoing packets are sent to the network connection 140 (i.e., IPv6 network connection). Alternatively, if the IP address for the incoming and outgoing packets is not an IPv6 address, the software module 210 drops the incoming and outgoing packets such that the incoming packets are not forwarded to the network stack or layer 230 of the computer device 200 and the outgoing packets are not forwarded to the network connection 140. Typically, the packets having an IP address other than an IPv6 address can include IPv4 (Internet Protocol Version 4) packets and ARP (Address Resolution Protocol) packets. In addition, the software module 210 can be set to other address protocols without departing from the inventive concept. It can be appreciated that the software module 210 can be configured to any address protocol or criteria as determined and set by a network administrator. For example, the software module 210 can be configured to allow packets such as NetBIOS, AppleTalk, and/or other protocols to be sent to the network connection and/or alternatively, received from the network connection, while dropping or preventing the transmission of certain types of packets, such as IPv4 and/or ARP packets.

In accordance with an exemplary embodiment, the software module 210 continuously monitors and manages the incoming and outgoing packets, which have been intercepted by the packet capture filter 220 and sent to the queue 250. As shown in FIG. 1, the system 100 preferably includes an IPv6 communication network between the host device 110 and the communication network 140. It can be appreciated that in accordance with an exemplary embodiment, the IPv6 address is a globally-unique address formed from a network prefix provided to the computer device by a router, combined with the computer device identifier as generated in forming a link-local address for the computer device. In addition, it can be appreciated that the software module's 210 functionality can be enabled or disabled at will by a network administrator or other designated individual.

The computer device 200 also has an operating system (OS) 240, which acts as an interface between hardware and user is responsible for the management and coordination of activities and the sharing of the resources within the image forming apparatus. In accordance with an exemplary embodiment, the software module 210 runs on the operating system 240 of the computer device (or image forming apparatus) 200, and the network layer 230 is under or a part of the operating system 240. It can be appreciated that by utilizing a software module 210 as described herein, the operating system 240 of the computer device 200 does not need to be altered or changed in anyway. In addition, the network administrator has the ability to facilitate an IPv6 only network, which in the absence of the software module 210 will be set forth by the operating system. Thus, a network administrator has additional flexibility and ability to facilitate an IPv6 only network without regards to the IP address protocol as set forth by the operating system 240 of the computer device (or image forming apparatus) 200. For example, for a Linux operating system, the netfilter library could be utilized to set up the application or software module to filter the incoming and outgoing IPv4 and ARP packets.

It can be appreciated that the exemplary embodiments as generally described herein provide for a run time IPv6 only network. However, in accordance with an exemplary embodiment, the software module 210 can be configured to have an Internet Protocol (or "IP") criteria other than IPv6 for incoming and outgoing data packets without departing from scope of the present invention. In addition, rather than having a separate software module or application as described above, the operating system 240 of the computer device 200 can be configured with an IP networking criteria, which filters incoming and outgoing data packets as described herein.

Figure 3:
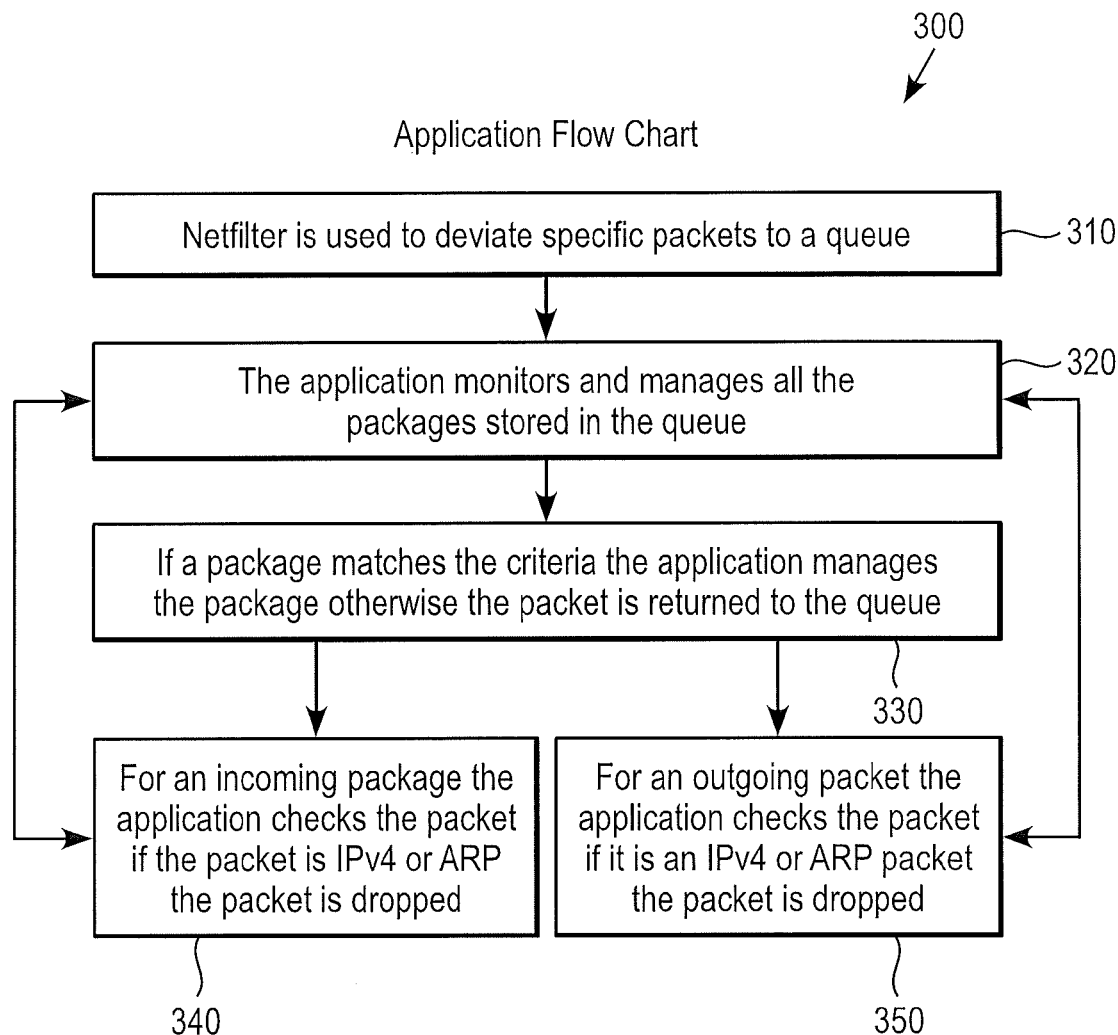
FIG. 3 is a flow chart showing another exemplary embodiment of an implementation of an application, which uses a packet capture filter for a run time IPv6 only network in accordance with an exemplary embodiment.

FIG. 3 is an illustration showing a flow chart of an implementation of an application 300, which uses a packet capture filter for a run time IPv6 only network in accordance with an exemplary embodiment. As shown in FIG. 3, in step 310, the application 300 includes a packet capture filter (or "netfilter"), which is used to deviate specific data packets to a queue. In accordance with an exemplary embodiment, in step 320, the application (or software module) monitors and manages each of the packages (or packets) stored in the queue. In step 330, if a package matches the criteria, the application manages the package. Alternatively, if the package does not match the criteria, the package is returned to the queue. For an incoming package (or packet) in step 340, the application checks the package, and if the package is an IPv4 or ARP packet, the packet is dropped (i.e., the packet is not sent or forwarded to the network stack for processing). Alternatively, in step 350, for outgoing packets, the application (or software module) checks the outgoing packet, and if the packet is an IPv4 and ARP packet, the packet is dropped (i.e., a packet is not sent or forwarded to the network communication).

Figure 4:
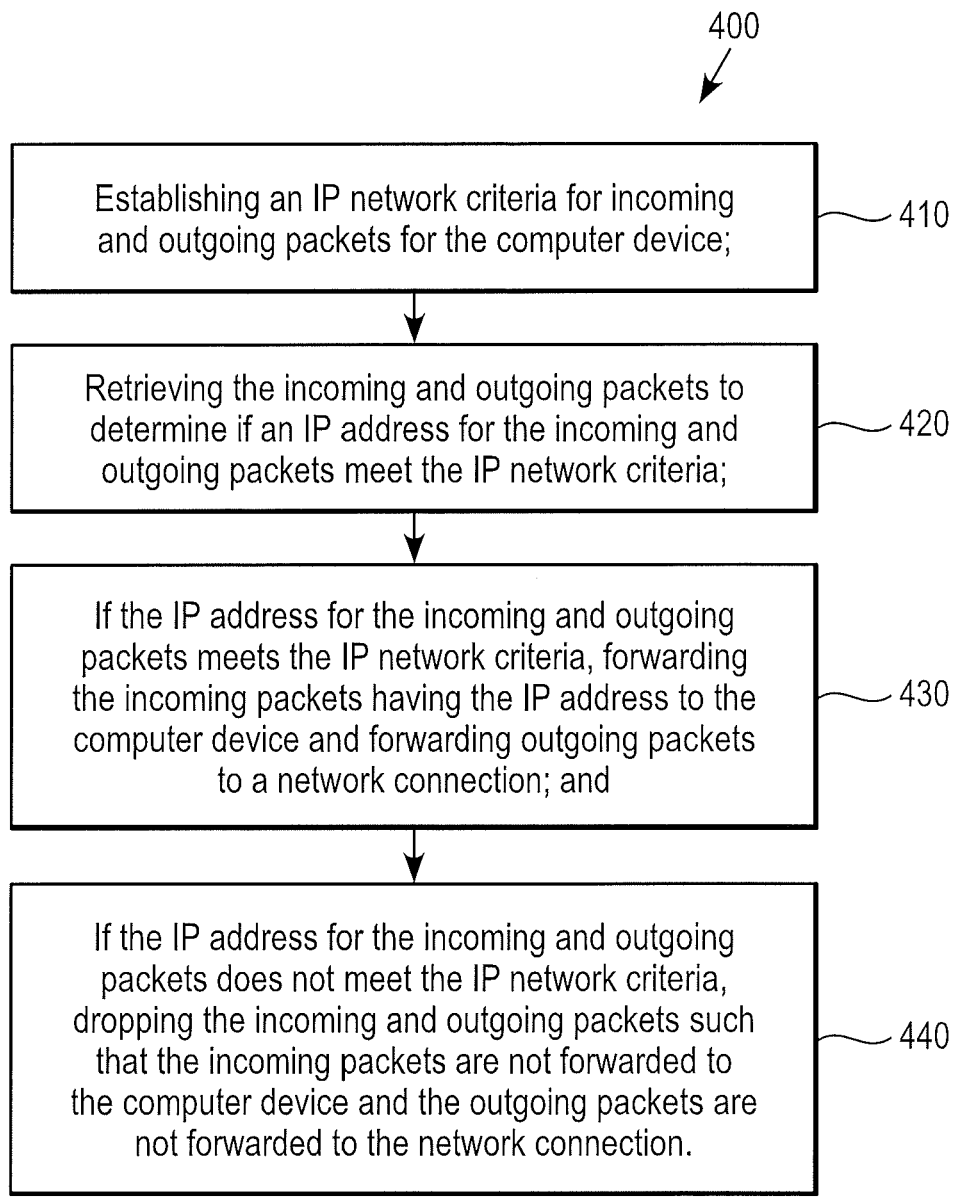
FIG. 4 is a flow chart showing a further exemplary embodiment of an implementation of an application, which uses a packet capture filter to facilitate an network environment in accordance with a further exemplary embodiment.

FIG. 4 is an illustration showing a flow chart of an implementation of a method of enabling a computer device to facilitate an IP network environment 400. The method 400 includes a computer device having a software module, which in step 410 establishes an IP network criteria for incoming and outgoing packets for the computer device. In step 420, the software module retrieves the incoming and outgoing packets to determine if an IP address for the incoming and outgoing packets meet the IP network criteria. In step 430, if the IP address for the incoming and outgoing packets meets the IP network criteria, forwarding the incoming packets having the IP address to the computer device and forwarding outgoing packets to a network connection. Alternatively, in step 440, if the IP address for the incoming and outgoing packets does not meet the IP network criteria, dropping the incoming and outgoing packets such that the incoming packets are not forwarded to the computer device and the outgoing packets are not forwarded to the network connection.

In accordance with another exemplary embodiment, a computer program product comprising a non-transitory computer usable medium having a computer readable code embodied therein for controlling a computer device, the computer readable program code configured to cause the computer device to accept only IPv6 network packets, the process comprising the steps of: (a) establishing an IP network criteria for incoming and outgoing packets for the computer device; (b) retrieving the incoming and outgoing packets to determine if an IP address for the incoming and outgoing packets meet the IP network criteria; (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system that facilitates an IP network environment comprising:
    a computer device, the computer device have having a software module, which performs the following steps:
    (a) establishing an IP network criteria for incoming and outgoing packets for the computer device;
    (b) retrieving the incoming and outgoing packets to determine if an IP address for the incoming and outgoing packets meet the IP network criteria;
    (c) if the IP address for the incoming and outgoing packets meets the IP network criteria, forwarding the incoming packets having the IP address to the computer device and forwarding outgoing packets to a network connection; and
    (d) if the IP address for the incoming and outgoing packets does not meet the IP network criteria, dropping the incoming and outgoing packets such that the incoming packets are not forwarded to the computer device and the outgoing packets are not forwarded to the network connection, and wherein the IP address other than an IPv6 address for the incoming and outgoing packets, which do not meet the IP network criteria are IPv4 (Internet Protocol Version 4) packets and ARP (Address Resolution Protocol) packets.

2. The system of claim 1, wherein the computer device further includes a packet capture filter, which intercepts the incoming and outgoing packets and directs the incoming and outgoing packets into a queue for processing by the software module.

3. The system of claim 2, wherein the packet capture filter intercepts an incoming packet before a network layer analyses of the incoming packet.

4. The system of claim 2, wherein the packet capture filter intercepts an outgoing packet after a network layer has created the packet and before forwarding the outgoing packet to a data link layer.

5. The system of claim 4, wherein the data link layer is a protocol layer, which transfers data between adjacent network nodes in a wide area network or between nodes on a same local area network segment.

6. The system of claim 2, wherein the software module continuously monitors and manages the incoming and outgoing packets in the queue.

7. The system of claim 1, wherein the IP network criteria is IPv6 addresses only and the network connection is an IPv6 network.

8. The system of claim 1, wherein the computer device is an image forming apparatus, and the system includes a host device, which receives and sends incoming and outgoing data packets.

9. A method of enabling a computer device to facilitate an IP network environment comprising:
    (a) establishing an IP network criteria for incoming and outgoing packets for the computer device;
    (b) retrieving the incoming and outgoing packets to determine if an IP address for the incoming and outgoing packets meet the IP network criteria;
    (c) if the IP address for the incoming and outgoing packets meets the IP network criteria, forwarding the incoming packets having the IP address to the computer device and forwarding outgoing packets to a network connection; and
    (d) if the IP address for the incoming and outgoing packets does not meet the IP network criteria, dropping the incoming and outgoing packets such that the incoming packets are not forwarded to the computer device and the outgoing packets are not forwarded to the network connection, and wherein the IP address other than an IPv6 address for the incoming and outgoing packets, which do not meet the IP network criteria are IPv4 (Internet Protocol Version 4) packets and ARP (Address Resolution Protocol) packets.

10. The method of claim 9, further comprising intercepting the incoming and outgoing packets and directing the incoming and outgoing packets into a queue for processing by a software module, which performs steps (a)-(d).

11. The method of claim 10, wherein the incoming packet are intercepted before a network layer analyses of the incoming packet, and outgoing packets are intercepted after a network layer has created the packet and before forwarding the outgoing packet to a data link layer.

12. The method claim 10, wherein the software module continuously monitors and manages the incoming and outgoing packets in the queue.

13. The method of claim 10, further comprising establishing an IPv6 connection between the computer device and a host device, and wherein an IPv6 address of the computer device and the host device are configured automatically using a stateless address autoconfiguration.

14. The method of claim 9, comprising:
    hosting the IP network criteria for incoming and outgoing packets for the computer device on a software module within the computer device.

15. A computer program product comprising a non-transitory computer usable medium having a computer readable code embodied therein for controlling a computer device, the computer readable program code configured to cause the computer device to accept only IPv6 network packets, the process comprising the steps of:
    (a) establishing an IP network criteria for incoming and outgoing packets for the computer device;
    (b) retrieving the incoming and outgoing packets to determine if an IP address for the incoming and outgoing packets meet the IP network criteria;
    (c) if the IP address for the incoming and outgoing packets meets the IP network criteria, forwarding the incoming packets having the IP address to the computer device and forwarding outgoing packets to a network connection; and (d) if the IP address for the incoming and outgoing packets does not meet the IP network criteria, dropping the incoming and outgoing packets such that the incoming packets are not forwarded to the computer device and the outgoing packets are not forwarded to the network connection, and wherein the IP address other than an IPv6 address for the incoming and outgoing packets, which do not meet the IP network criteria are IPv4 (Internet Protocol Version 4) packets and ARP (Address Resolution Protocol) packets.

16. The computer program product of claim 15, further comprising executable instructions for:

intercepting the incoming and outgoing packets and directing the incoming and outgoing packets into a queue for processing by a software module, which performs steps (a)-(d), and wherein the incoming packet are intercepted before a network layer analyses of the incoming packet, and outgoing packets are intercepted after a network layer has created the packet and before forwarding the outgoing packet to a data link layer.

17. The computer program product of claim 16, wherein the software module continuously monitors and manages the incoming and outgoing packets in the queue.

18. The computer program product of claim 15, comprising:

hosting the IP network criteria for incoming and outgoing packets for the computer device on a software module within the computer device.

* * * * *